(12) United States Patent
Glazer

(10) Patent No.: US 12,127,087 B2
(45) Date of Patent: Oct. 22, 2024

(54) SYSTEM AND METHOD FOR FACILITATING PHYSICAL SERVICES

(71) Applicant: Yariv Glazer, Palo Alto, CA (US)

(72) Inventor: Yariv Glazer, Palo Alto, CA (US)

(*) Notice: Subject to any disclaimer, the term of this patent is extended or adjusted under 35 U.S.C. 154(b) by 527 days.

(21) Appl. No.: 17/246,670

(22) Filed: May 2, 2021

(65) Prior Publication Data
US 2021/0352453 A1 Nov. 11, 2021

Related U.S. Application Data

(60) Provisional application No. 63/020,549, filed on May 6, 2020, provisional application No. 63/020,550, filed on May 6, 2020.

(51) Int. Cl.
| | |
|---|---|
| *H04W 4/50* | (2018.01) |
| *G01J 1/42* | (2006.01) |
| *G01K 3/00* | (2006.01) |
| *G01W 1/14* | (2006.01) |
| *G06Q 10/083* | (2024.01) |
| *H04W 4/029* | (2018.01) |
| *H04W 4/20* | (2018.01) |
| *H04W 4/80* | (2018.01) |

(52) U.S. Cl.
CPC ............. *H04W 4/50* (2018.02); *G01J 1/4204* (2013.01); *G01K 3/005* (2013.01); *G01W 1/14* (2013.01); *G06Q 10/083* (2013.01); *H04W 4/029* (2018.02); *H04W 4/20* (2013.01); *H04W 4/80* (2018.02)

(58) Field of Classification Search
CPC ......... H04W 4/50; H04W 4/029; H04W 4/80; H04W 4/20; G01J 1/4204; G01K 3/005; G01W 1/14; G06Q 10/083
USPC ....................................................... 455/426.1
See application file for complete search history.

(56) References Cited

U.S. PATENT DOCUMENTS

| | | | | |
|---|---|---|---|---|
| 5,652,570 | A * | 7/1997 | Lepkofker | G08B 21/0283 340/8.1 |
| 9,720,555 | B2 * | 8/2017 | Sorden | G06T 11/60 |
| 11,012,967 | B1 * | 5/2021 | MacLean | H04W 4/029 |
| 2014/0002277 | A1 * | 1/2014 | Fulger | G08G 1/0967 340/905 |

(Continued)

*Primary Examiner* — William Nealon

(57) ABSTRACT

A system for directing physical service to a precise location includes a communication channel for transmitting and receiving data, a user-end electronic device for requesting a service, a service notification server for receiving service requests, a plurality of physical notification devices having at least two states, connected to the communication channel and capable of changing their state based on data received over the communication channel; wherein the user-end electronic device is capable of generating a service delivery request and transmits the service delivery request through communication channel; wherein another transmitting and receiving circuit receives the service delivery request, initiating a service notification processor to generates a change-in-state order for a plurality of physical notification devices and transmits the change-in-state order through the other transmitting and receiving circuit to the communication; and wherein the plurality of physical notification devices receives the change-in-state order and at least one of the plurality of physical notification devices changes its state in response to receiving the order.

17 Claims, 9 Drawing Sheets

(56) References Cited

U.S. PATENT DOCUMENTS

2015/0365633 A1* 12/2015 Glazer .................. H04W 12/02
348/143
2016/0066157 A1* 3/2016 Noorshams ............. H04W 4/80
455/457
2020/0068369 A1* 2/2020 Liao ........................ H04W 4/06

* cited by examiner

SYSTEM AND METHOD FOR FACILITATING PHYSICAL SERVICES

This application is a continuation application of U.S. Provisional Application No. 63/020,550, filed May 6, 2020, and incorporates by reference the disclosure therein.

FIELD AND BACKGROUND OF THE INVENTION

The present invention relates to a system and method for facilitating physical services, particularly to those systems and methods useful for services that are sensitive to cyber-attacks.

Many times, services need to be delivered to a physical location on a non-periodic basis. In many situations—such as when an elderly or disabled person enters a large building, such as an airport, and needs mobility assistance—a notification that the delivery of a service to a physical location is required. This can also occur when someone wants food delivered to a location within a large building, or when a party drops off a parcel that is intended to be picked-up by the other party, or even when the physical condition of an object needs service, such as a bridge or window that needs repair. Additionally, current location-based services are often thwarted by poor cell-phone reception inside of large buildings, such as airports, train-stations, shopping malls, and office buildings.

In order to solve this problem, a system and method is needed that can take either an automatic or manual service delivery request, and forward the request in near real time to the appropriate party.

SUMMARY OF THE PRESENT INVENTION

The present invention is a system and method for facilitating physical services.

According to one embodiment of the present invention, a facilitation system comprises of: A user-end electronic device capable of generating a service delivery request, a service notification processor, a communication channel for transmitting between the user-end electronic device requesting service and the service notification processor, a plurality of physical notification devices, a communication channel between at least one service notification processor and the plurality of physical notification devices, and a computer readable instruction set-stored on a non-transitory, computer-readable, media, accessible to at least one service notification processor, that allows the service notification processor to note that a service delivery was requested by the user-end electronic device. A physical notification device has a state that can be switched between at least two states. For example, a physical notification device might be a light that can be either on or off. The state of the device is therefore either "on" or "off." Building on this example, a physical notification device might be a colored light that can be "red", "yellow", or "green" such as a familiar traffic-light. A physical notification device has to have at least two states and it has to be able to change the state in response to a change-in-state order. The physical location for the delivery is precisely known. The communication channel, itself, is unremarkable. It is one or more of the following well-known public protocols: Bluetooth, ZigBee, Vehicle-to-Vehicle ("V2V"), Vehicle-to-Infrastructure ("V2I"), Dedicated Short Range Communications ("DSRC"), wired local area network ("LAN"), Wi-Fi, a cellular network access device, and a wired network. It can make use of physical transducers, such as a sound transducer or a light transducer, coupled with the appropriate sensor.

A user-end electronic device will typically have a processor, a non-transitory computer-readable memory element, a chipset allowing for the transmitting and receiving of data and signals, an input device, and output device, and a power-supply. A cellphone is an example of user-end electronic device, and it usually contains a chipset allowing for transmitting and receiving using Bluetooth and a second chipset allowing for transmission and receiving of signals and data using the cellular network. A cellphone often has a touchscreen, acting as both the input device and output device. A user-end electronic device can also be a control network containing a sensor, a controller (a processor specifically intended to control a system), a non-transitory, computer-readable memory element, and a transmitting and receiving chipset.

The service delivery request can be generated automatically by the user-end electronic device using a sensor: such as a pressure sensor, proximity sensor, location sensor, temperature sensor, clock, calendar, etc. The service delivery request can be generated manually by a user, using an input function on the user-end electronic device.

In an alternative embodiment, a facilitation method comprises the steps of generating a service delivery request by: using a user-end electronic device, transmitting the service delivery request to at least one service notification processor using a communication channel that connects the user-end electronic device to at least one service notification processor, receiving the service delivery request at the service notification processor, using a computer readable instruction set—stored on a non-transitory, computer-readable, media, and accessible to at least one service notification processor to select a physical notification device, from a plurality of physical notification devices that should receive the service delivery request, transmitting the service delivery request from at least one service notification processor to one of a plurality of physical notification devices using a communication channel that connects at least one service notification processor to the plurality of physical notification devices; and issuing a physical notification using the physical notification device selected by the service notification processor.

An application of the present invention is to employ the method to provide services for senior citizens. The method consists of a user, in this case an elderly person, entering a pre-defined perimeter, such as entering a building. The user's smartwatch communicates with a service notification processor to request assistance. The service notification processor is capable of determining the user's position within the perimeter. The service notification processor uses a computer readable instruction set, containing a facilitative profile of the elderly person. The facilitative profile can be stored in the smartwatch, or by a non-transitory, computer-readable memory element accessible to the service notification processor. The facilitative profile identifies services needed by the elderly person. The smartwatch communicates with the service notification processor, providing location information. The service notification processor can communicate with the smartwatch to let the elderly person know whether or not the facility offers the required services.

In another application of the method and system embodiments of the present invention, the location of the service notification processor is in shopping mall with a plurality of service location processors, located at different locations throughout the shopping mall, and the pizza is delivered to the location of the service notification processor. Further embodiments are described wherein the customer order pizza at the location of service notification processor and following a later notification, the pizza is delivered to a service notification processor at a different location.

In another application of the method and system embodiments of the present invention, a computer-readable instruction set called a postal application, resident on non-transitory, computer readable media on a customer mobile electronic device, wherein at least one processor on the customer mobile electronic device is capable of running the computer-readable instruction set, a customer who requests a package pickup from a mailbox through the postal application, the postal application communicates the service delivery request to pick-up the package with the service notification processor of the mailbox. The service notification processor broadcasts a signal that a service request was made. Another phone receives the notification and sends the order notification to the postal service, which sends a postal worker to the pickup location. When the postal worker arrives at the mailbox and picks up the package, using a phone, the postal worker clears the notification from the service notification processor of the mailbox.

Another embodiment is described wherein there is a sensor on the mailbox that automatically triggers a service delivery request when a parcel is dropped. The sensor then sends a service delivery request to pick-up the parcel to the service notification processor which broadcast a signal that a service request was made. A mobile phone of a passerby receives the notification and sends the order notification to the postal service, which sends a postal worker to the pickup location. When the postal worker arrives at the mailbox and picks up the package, the postal worker clears the notification, using a phone, from the service notification processor of the mailbox.

Yet another embodiment is described wherein a customer requests a package delivery to a mailbox location through the postal service mobile app. The postal service sends a notification signal request to a phone at the vicinity of the mailbox location. The phone communicates the notification signal request to the service notification processor which broadcast a signal to the postal worker. When the postal worker arrives at the mailbox and drops off the package, the postal worker updates the postal service and notify the service notification processor of the mailbox that the package has been arrived at the mailbox. The service notification processor changes the broadcasted signal to notify the customer that the package has arrived at the mailbox. The customer then picks up the package and the service notification processor clear the signal.

The invention is particularly useful to an infrastructure integrity monitoring system wherein sensors collect structural data of a bridge and a local edge processor identify an integrity issue. The edge processor communicates with a service notification processor to request a repair service. The service notification processor broadcast a notification signal that a service delivery request was made. A passerby receives the broadcasted signal and sends the notification signal to the infrastructure management organization, which sends a repair team to the bridge location. When the repair team arrives at the location and examine the infrastructure, the repair team use an app on their phone to communicate with the service notification processor in order to clear the service delivery request and the request notification signal.

More embodiments are described wherein location aware sensors are placed for monitoring air, water, or soil quality. Still more embodiments are described wherein sensors are placed to monitor radiation or sound levels. These sensors communicate with alert notification processors to notify of special events. The alert notification processor broadcasts an alerting signal. A passerby phone receives the broadcasted signal and sends it to the environmental protection agency, which sends a team to assess the scope of the event. When the assessment team arrives, they use their mobile devices to communicate with the alert notification processors in order to clear the alert.

The invention is also useful for ad-hoc transportation services wherein a rider requests a pickup from an ad-hoc location, such as a temporary bus stop or an alternative pickup spot. The mobile phone of the rider communicates with a location aware service notification processor, installed at the vicinity of the pickup spot. The service notification processor broadcast a notification signal that a pickup request was made. Passing buses or approved rideshare vehicles receives the broadcasted signal and sending it to the designated bus or transport vehicle. The vehicle arrives to the spot and pick up the rider. When the driver arrives at the bus stop and picks up the rider, the vehicle notifies the bus stop sensor that the rider has been picked up and the bus stop sensor deletes the pickup request and cancel the pickup notification.

Another application of the invention is to enable assistance requests at a specific location in a store or a shopping mall wherein a customer requests the assistance using a mobile app. The app communicates the request with a service notification processor install at the vicinity of the customer. The service notification processor broadcast a notification, which receives by an app that installed on mobile phones of store attendants until a store attendant arrives. When the attendants arrive at the location of the customer, they use their mobile device to communicate with the service notification processor for clearing the notification.

The invention is particularly advantageous with respect to personal safety services wherein a student uses a personal safety service while walking alone at night. When the student perceives she is in danger, she triggers a silent alert through the mobile app of the personal safety service. The mobile app communicates with a location aware crowd-source security processor install in her vicinity. The crowd-source security processor store the emergency distress call and broadcast a distress signal. The mobile phones of people in the vicinity receives the distress signal and sends it to the public safety agency which dispatch a security team to the location of the sensor. When the security team arrives, they use their mobile devices to communicate with the crowd-source security processor to clear the distress call.

Another embodiment of the invention describes a student safely and independently use the public bus system at night. The student requests a ride through a mobile app which communicates the request to the bus stop notification processor that is installed on the bus stop. The bus stop notification processor broadcast a notification that a pickup request was made by a student. An RF transceiver installed in passing buses on the other direction receives the notification and send it up the route to the desired bus as well as to the bus dispatch center. The RF transceiver installed in the desired bus then notifies the bus driver to look for and pick up the rider at the bus stop. When the bus arrives at the bus stop and picks up the student, the bus transceiver communicates with the bus stop notification processor to clear the request notification.

The invention is also beneficial for riders of public transportation that need to transfer from one bus to another in order to get to their destination wherein the mobile app of the rider communicates with a bus notification processor a transfer request to another bus. The bus notification processor stores the request. Upon arriving to the transfer stop, the bus notification processor broadcast using Vehicle to Vehicle (V2V)/Vehicle to Infrastructure (V2I) protocols a notification signal. The other bus receives the request and notify the driver to wait for the rider to transfer from the previous bus.

The invention is particularly useful for families of dementia patients wherein some embodiments describe a family that use a virtual fencing service to ensure the safety of their grandmother suffering from dementia. When the grandmother goes on a walk alone and crosses her virtual boundary, her smartwatch communicates with the virtual fencing processor of the segment where she crossed. The virtual fencing processor stores the information and broadcast an emergency signal. The phone of the grandmother, or a phone of a passerby receives the signal and sends a notification to the virtual fencing service, which notifies her family about the location of their grandmother. When the family locates their grandmother, they use their phone to communicate with the virtual fencing notification processor in order to clear the emergency signal.

The invention is particularly beneficial for visual impaired persons wherein the mobile app of the visual impaired person communicates with a bus stop notification processor that is installed on the bus stop. The bus stop notification processor stores the pickup request and broadcast a notification signal. An RF transceiver installed on Passing buses receive and send the notification to the desired bus. The RF transceiver installed on the desired bus receives the transmission and the bus picks up the rider at the bus stop. Then the RF transceiver installed on the bus communicate with the bus stop notification processor that the rider safely entered the bus. The RF transceiver that installed on the desired bus also communicates with the bus stop notification processor to delete the ride request and cancel the ride request notification.

Other embodiments of the invention describe distributed, air gapped traffic management systems wherein an autonomous vehicle encounter heavy traffic in their planned route. An RF transceiver installed on the vehicle communicates using V2I protocols a heavy traffic alert to a traffic notification processor installed on traffic signs along the route. The traffic notification processor stores the alert and broadcast a signal for both the coming traffic and the opposite direction traffic. Vehicles travelling in the opposite direction pick up the broadcast, stores the heavy traffic alert, and communicate the alert to other traffic notification processor installed on traffic signs along their route, distributing the alert notification up the roads going to the heavy traffic. Each of the receiving traffic notification processors stores the heavy traffic alert and broadcasts a heavy traffic alert notification. Vehicles going towards the point of heavy traffic receives the notification and recalculate their path to avoid the heavy traffic.

The invention is particularly useful for air-gapped path finding systems wherein a leading vehicle is travelling on-road or off-road. When the vehicle change direction, it programs and leaves along the road a breadcrumb notification processor to signal the new heading. Later vehicles, travelling along the route of the leading vehicle, receives the notification and calculate new path accordingly. When breadcrumb notification processors signal rough terrain or heavy traffic, later vehicles may drop new breadcrumb notification processors to signal the issue earlier, pushing the signal up the path in order to increase the flexibility of route re-calculations for later vehicles. Several embodiments of the invention describe the vehicles traveling in Sub terrain, underground or underwater environments. Some examples include unmanned vehicles for rescuing miners and tunnel workers using vibrating devices as bread cramps to overcome RF limitation under the ground. Other examples include divers traveling along an underwater scenic path which is marked by signals from sound emitting devices as breadcrumbs. More examples describe search and rescue tasks that include autonomous flying machines using each other blinking lights as breadcrumb.

The foregoing recitation of service location process, a local edge processor, an alert notification processor, a crowdsource security processor, a bus stop notification processor, a virtual fencing processor, a traffic notification processor, and a breadcrumb notification processor are all examples of a general concept referred to as a "surveillance process." Some embodiments of the invention describe time-sensitive notification signals wherein the signal decay or increase with the passing time, indicating the time passed from the signal activation. Such intensity change may be manifested as the number of RF broadcasts over a time period, the content of the broadcast, and the radio frequency of the broadcast. Other embodiments of the invention describe severity-sensitive notification signals wherein the signal strength or type indicate the severity of the event. More embodiments of the invention describe chemical notification signals wherein the notification processor include devices capable of dispersing chemical materials. Still more embodiments of the invention describe notification processor with circuitry to broadcast electromagnetic wave signals. Yet more embodiments of the invention describe wherein the notification processor include circuitry for emitting signals in the form of pressure wave such as sound and vibration.

The invention is also beneficial to cybersecurity application in which networks of air-gapped nodes require a local presence in order to access information moving in their network. Some examples embodiments describe requests, initiated by a requesting terminal. The requesting terminal communicates with an air-gapped node to place the request. The air-gapped node stores the request and broadcast a signal that a request was made. A mobile terminal at the vicinity of the air-gapped node receives the signal and communicate with the air-gapped node to receive the request. The mobile terminal travel to the vicinity of another air-gapped node and communicate to place the request with the other air-gapped node, which stores the request and broadcast a signal that a request was made. In that way the request is being propagated through an area.

It will thus be seen that, while the invention has been described with respect to a number of embodiments, these are set forth merely for purposes of example, and that many other variations, modifications, and applications of the invention may be made.

BRIEF DESCRIPTION OF THE DRAWINGS

The invention is herein described, by way of example only, with reference to the accompanied drawings, wherein.

DESCRIPTION OF PREFERRED EMBODIMENTS

Figure 1:
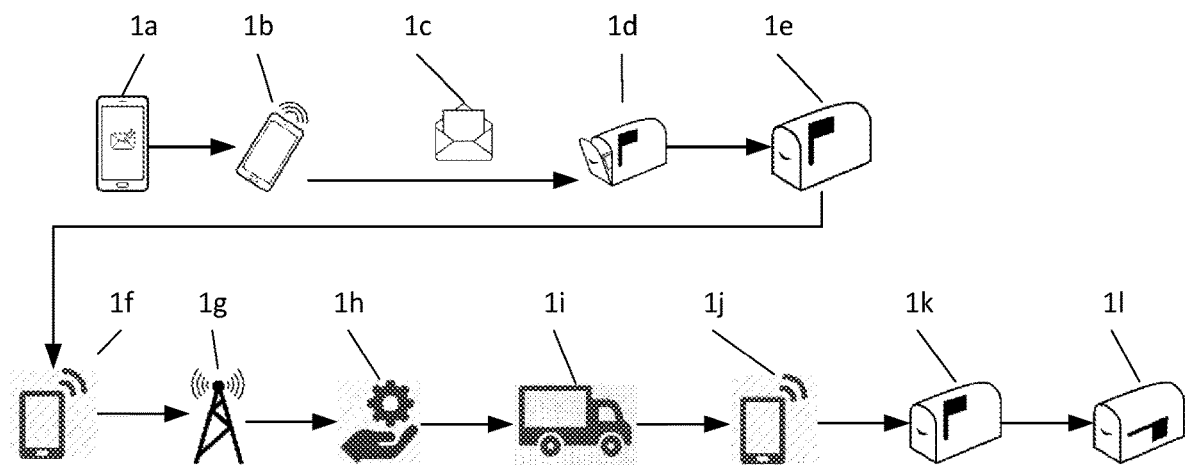
FIG. 1 is a block diagram of an overall system constructed in accordance with the present invention.

The present invention is a system and method for facilitating physical services, particularly to such systems and methods useful for services that are sensitive to cyber-attacks. FIG. 1 is a block diagram of an overall system constructed in accordance with the present invention.

As schematically shown in FIG. 1, the system includes at least one device (1a) with a requesting application (1b), communicating a service delivery request (1c) to a service notification processor (1d), which upon receipt of the request, broadcasts a service delivery request notification signal (1e). A mobile device (1f) receives the service delivery request notification signal (1e) and communicates (1g) with a service center (1h) the request notification. The method further includes a service provider (1i) with a device (1j) capable of communicating with the service notification processor (1d), send by the service center (1h) to deliver the requested service. Upon delivering the service, the device of the service provider (1j) communicates with the service notification processor (1d) that broadcast the request notification signal (1k), to clear (1l) the notification signal. In this case, the device of the service provider (1j) is the physical notification device (1j), and it can change states from having no current service order to having a current service order.

Figure 2:
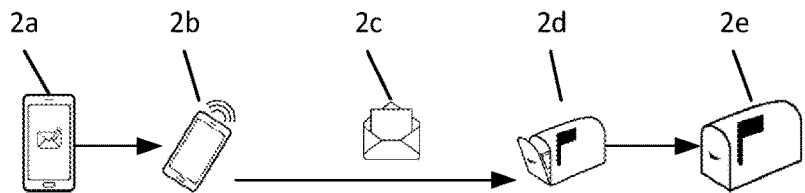
FIGS. 2 and 3 schematically illustrates one embodiment of the invention, wherein a service delivery request is made, and the service is delivered.
Figure 3:
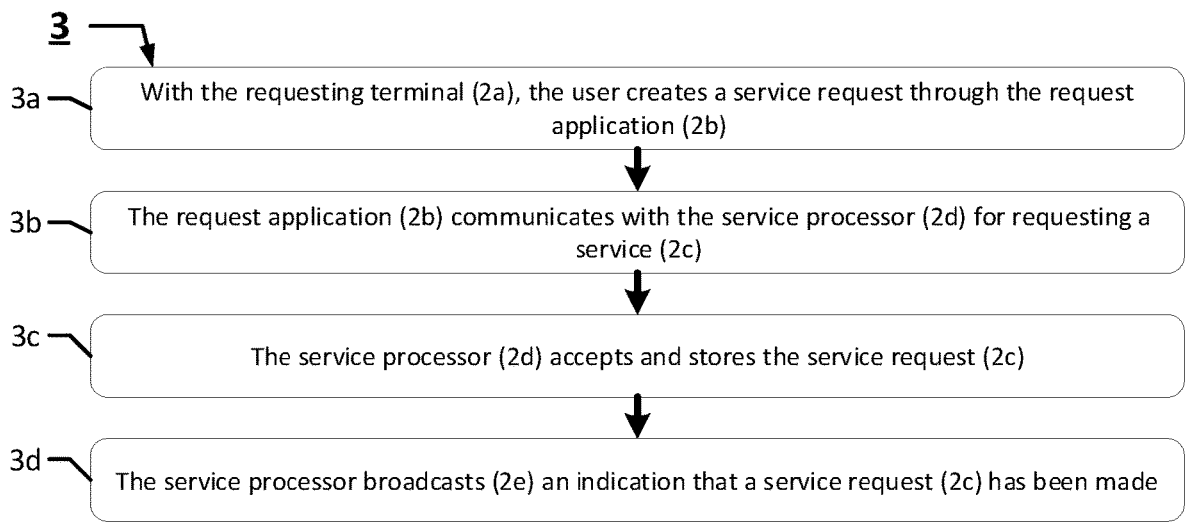

The block diagram in FIG. 2 and the flow diagram in FIG. 3 schematically illustrates one embodiment of the invention, wherein using a requesting terminal 2a, users create service delivery requests through a request application (2b); the request application (2b) initiates communication with a service processor (2d) for requesting a service (2c); service processor 2d accepts and stores the service delivery request (2c); and broadcasts (2e) an indication that a service delivery request (2c) has been made.

Figure 4:
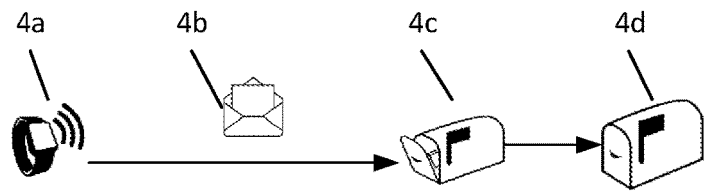
FIGS. 4 and 5 schematically illustrates a second embodiment of the invention, wherein a service delivery request is made without user intervention.
Figure 5:
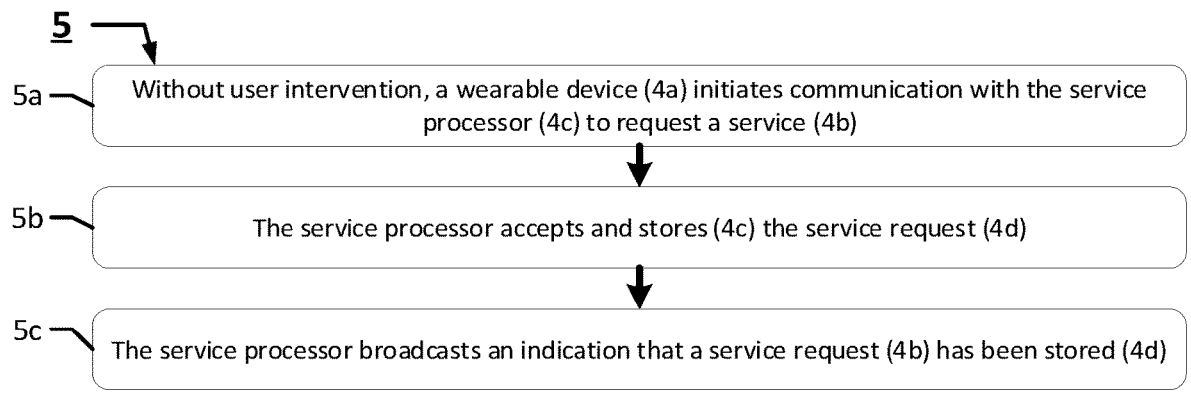

The block diagram in FIG. 4 and the flow diagram in FIG. 5 schematically illustrate a second embodiment of the invention. This embodiment is particularly useful for service delivery requests without user intervention.

Thus, as schematically illustrated, without the user intervention, a wearable device (4a) initiates communication with the service processor (4c) to request a service (4b), the service processor accepts (4c) the service delivery request (4b), and the broadcasts a notification signal that a service delivery request (4b) has been made (4d).

Figure 6:
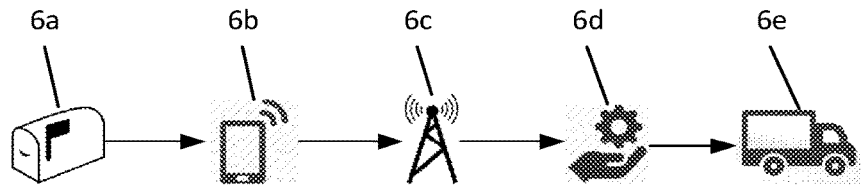
FIGS. 6 and 7 schematically illustrates a third embodiment of the invention, wherein a service delivery request is made, and the request is delivered to the service provider by a third party.
Figure 7:
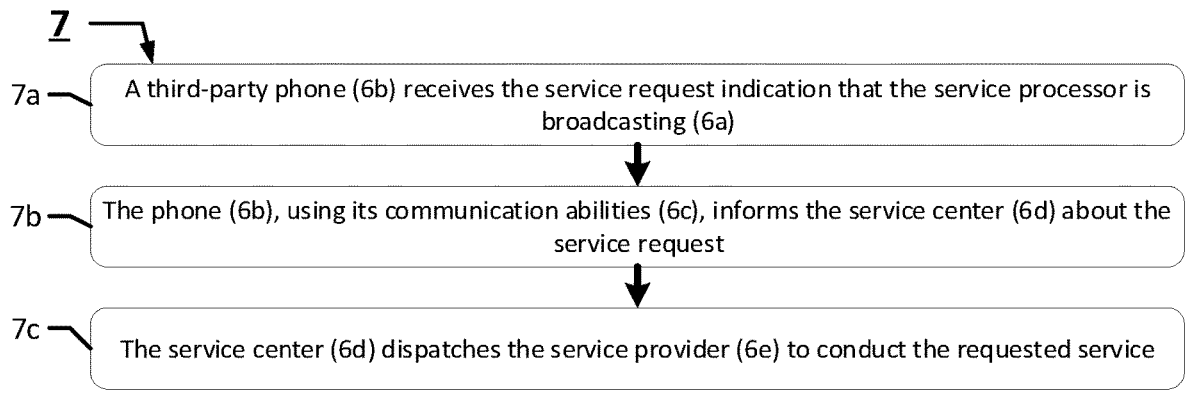

The block diagram in FIG. 6 schematically illustrates a third embodiment of the invention wherein a notification that a service was made is routed to a service provider. The embodiment is illustrated by the flow diagram in FIG. 7 wherein a third-party phone (6b) receives a service delivery request signal that the service processor is broadcasting (6a); phone 6b, using its communication abilities (6c), informs the service center (6d) about the service delivery request, and the service center (6d) dispatches the service provider (6e) to attend the request.

Figure 8:
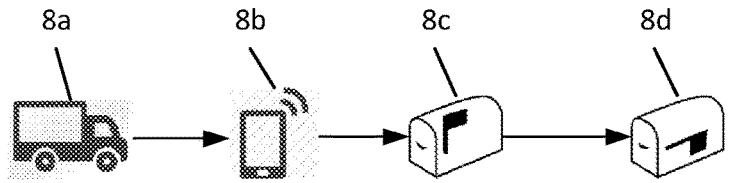
FIGS. 8 and 9 schematically illustrates an embodiment of the invention, wherein a service delivery request is delivered successfully by a service provider.
Figure 9:
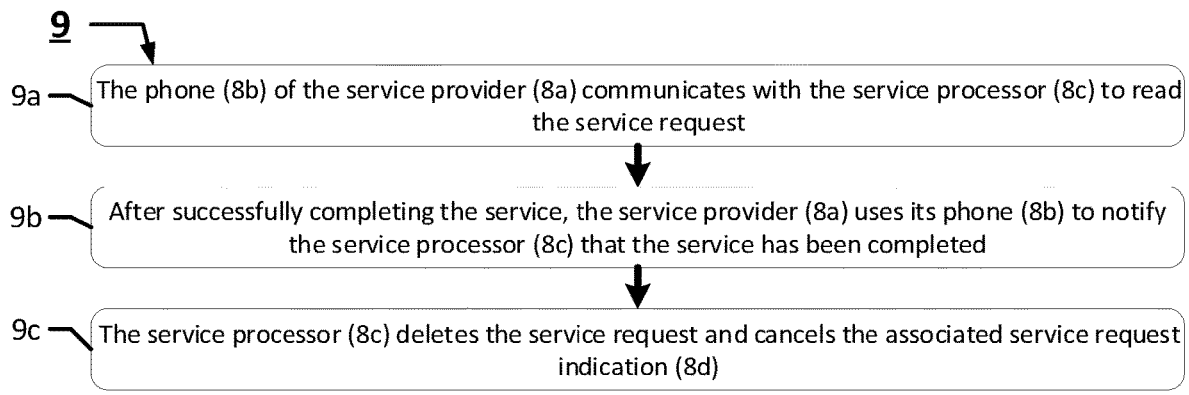

The block diagram in FIG. 8 schematically illustrates a fourth embodiment of the invention wherein a service was addressed. The fourth embodiment is also illustrated by the flow diagram in FIG. 9 wherein the service provider (8a) carries a device (8b) with abilities to communicate with service processors (8c) in order to receive the service delivery request. When the service delivery request was addressed, the service provider (8a) uses its mobile device (8b) to notify the service processor (8c). The device also communicates with service processor (8c) to delete the service delivery request and cancels the associated service delivery request indication (8d).

As also noted above, these embodiments are particularly useful for ordering pizza in that is it enable restaurants to deliver pizza to an ad-hoc location. Example of such embodiments described wherein a customer ordering pizza using the mobile application of the restaurant (2b), the mobile app communicates the order (2c) to a location-aware service notification processor (2d) at the vicinity of the customer. Service notification processor 2d broadcast a signal that an order was made (2e). Passerby phone (6b) receives the notification (6a) and communicates (6c) the order notification to the restaurant (6d). Restaurant 6d dispatch a delivery worker (6e) to deliver the pizza to the location of the service notification processor. The delivery worker arrives at the location (8a) and delivers the pizza to the customer. Upon delivering the pizza, the deliver worker communicates (8b) with the service notification processor to clear (8d) the notification signal (8c).

Some embodiments of the invention enable assistance requests at a specific location is being described, using FIGS. 2, 4, 6, and 8 wherein a woman perceives she is in danger and requests assistance using the personal safety service app (2b) on her mobile device (2a). The app (2b) communicates a distress request (2c) with a location-aware crowdsourcing security processor (2d) install in her vicinity. Crowdsourcing security processor 2d broadcast a distress signal and activate flashing lights (2e). Passerby sees (6b) the flashing lights (6a) and intervene to protect the woman. The phone of the passerby (6b) receives the distress signal and communicate with public safety agency (6d) which dispatch a security team (6e) to the location of the sensor. When the security team arrives (8a), they use their mobile device (8b) to communicate with the crowdsourcing security processor (8c) to clear the distress call and the flashing lights (8d).

The invention is also useful for families of dementia patients wherein some embodiments describe a family that use a virtual fencing service to ensure the safety of their grandmother suffering from dementia. While the grandmother goes on a walk alone inside her virtual boundary and crosses her virtual boundary, her smartwatch (4a) communicates with the virtual fencing processor of the segment where she crossed (4c). The virtual fencing processor stores the information and broadcast an emergency signal (4d). A phone of a passerby (6*b*) receives the signal and sends (6*c*) a notification to the virtual fencing service (6*d*), which notifies her family (6*e*) about the location of their grandmother. When the family locates their grandmother (8*a*), their phone communicates (8*b*) with the virtual fencing notification processor (8*c*) to clear the emergency signal (8*d*).

Figure 10:
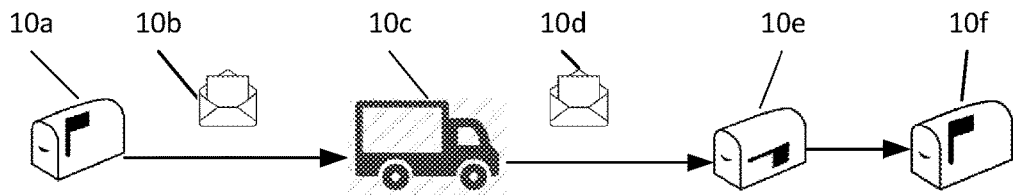
FIGS. 10 and 11 schematically illustrates yet another embodiment of the invention, wherein vehicles communicate with other vehicles and with elements of the road infrastructure to share road and traffic information.
Figure 11:
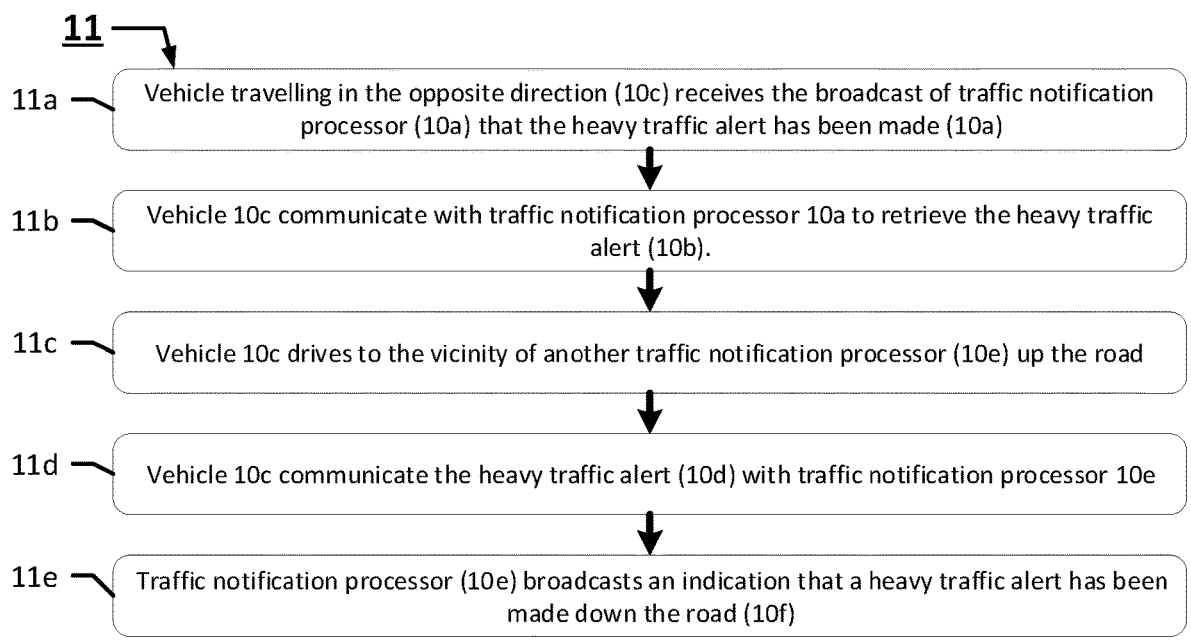

The block diagram in FIG. 10 schematically illustrates more embodiments of the invention wherein information between air-gapped nodes is delivered by physical agents such as people, animals, vehicles, marine vessels, or airplanes. These embodiments are specifically advantageous for cybersecurity application, area with limited communication, swarm structure, and stealth application. The embodiment is illustrated by the flow diagram in FIG. 11 wherein, for cybersecurity concerns, autonomous traffic is not connected to the internet. Vehicles travelling on the road (10*c*) receives the broadcast form traffic notification processors (10*a*) that heavy traffics alert has been made (10*a*) in the opposite direction. The vehicle (10*c*) communicates with traffic notification processor (10*a*) to retrieve the heavy traffics alert (10*b*) and propagate the alert to other traffic notification processors (10*e*) up their road, which broadcast advance notification signal (10*f*). New vehicles receiving the alerts have the time and option to recalculate new path in order to avoid the heavy traffic.

Some embodiments of the invention can be described by the Figs above where a woman use the public bus system at night. The woman requests a bus ride (2*c*) using a mobile app (2*b*). The app (2*b*) communicates the request (2*c*) to the bus stop notification processor (2*d*) that is installed on the bus stop. Bus stop notification processor 2*d* broadcast a notification (2*e*, 10*a*) that a ride request was made by a woman. Passing buses (10*c*) on the other direction receives the notification (10*b*) and communicate with other bus stop notification processor (10*e*) up their routes as well as to the bus dispatch center (6*d*). The desired bus (6*e*, 8*a*) receives the notification when passing by the broadcasting bus stop notification processor (10*e*). When the bus (8*a*) arrives at the bus stop and picks up the woman, the bus communicates (8*b*) with the bus stop notification processor (8*c*) to clear the request notification (8*d*).

More embodiments of the invention describe assistive services for visual impaired persons wherein a mobile app of visual impaired persons (2*a*) communicates (2*b*) with a bus stop notification processor (2*b*) that is installed on a bus stop to request a bus ride (2*c*). Bus stop notification processor (2*d*) stores the pickup request and broadcast a notification signal (2*e*, 10*a*). Passing buses (10*c*) receive the notification (10*b*) and communicate the notification to bus stop notification processor (10*e*) along the desired bus (8*a*) route. Desired bus 8*a* picks up the rider at the bus stop, and the bus communicate (8*b*) with the bus stop notification processor (8*c*, 2*e*) that the rider safely and successfully entered the bus. The bus stop notification processor (8*c*) deletes the ride request and cancel the ride request notification (8*d*).

Figure 12:
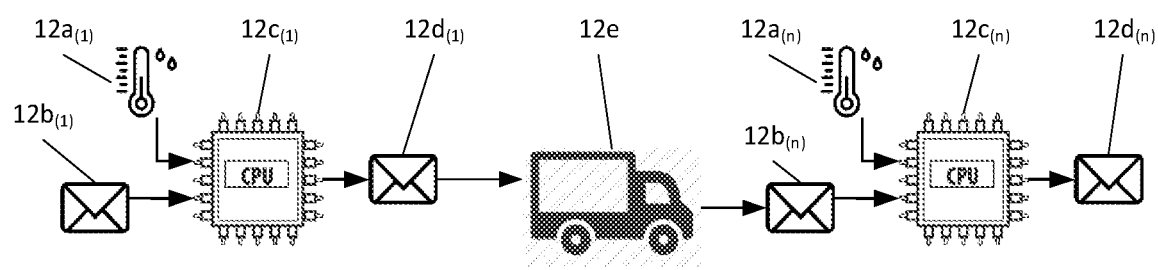
FIGS. 12 and 13 schematically illustrates further embodiment of the invention, wherein sensors are deployed for monitoring structural integrity of bridges in remote location with limited connectivity.
Figure 13:
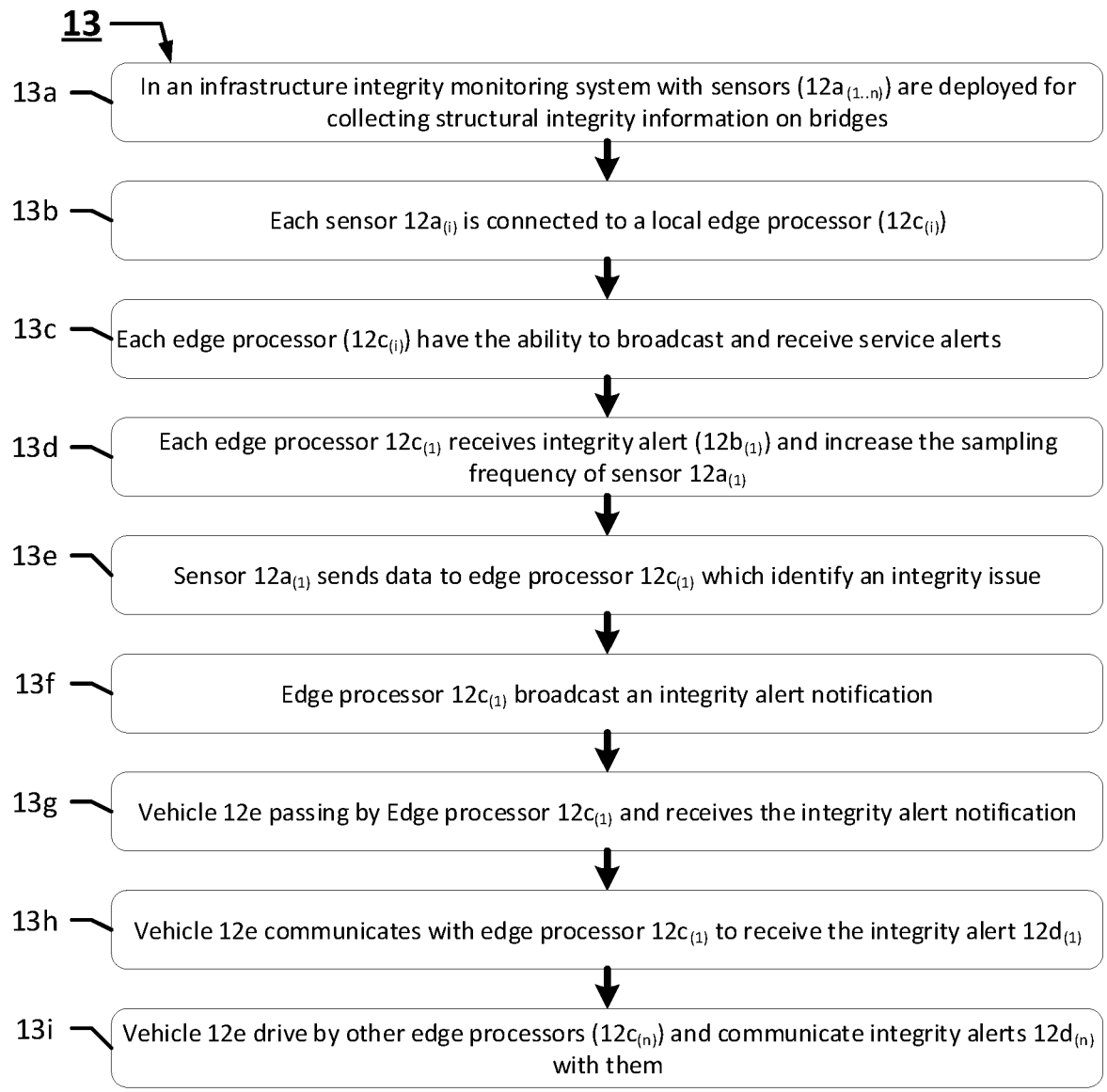

The block diagram in FIG. 12 schematically illustrates further embodiments of the invention wherein systems for monitoring environmental, ecological or structural integrity conditions are used. These embodiments are specifically beneficial when sensors are deployed in remote location with unreliable network conditions. One embodiment of such system is illustrated in the flow diagram of FIG. 13 wherein, infrastructure integrity monitoring system with sensors (12$a_{(1 \ldots n)}$) are deployed on bridges along country road. Each sensor 12$a_{(i)}$ is connected to a local edge processor (12$c_{(i)}$) that has the ability to broadcast and receive service alerts. Edge processor 12$c_{(1)}$ receives integrity alert (12$b_{(1)}$) from edge processors down the road and increase the sampling frequency of its sensor (12$a_{(1)}$). Data from sensor 12$a_{(1)}$ retrieved by edge processor 12$c_{(1)}$ which identify an integrity issue and broadcast an integrity alert notification. Vehicle 12*e* passing by edge processor 12$c_{(1)}$, receives the integrity alert notification and communicates with edge processor 12$c_{(1)}$ to receive the integrity alert 12$d_{(1)}$. The vehicle (12*e*) drive by other edge processors (12$c_{(n)}$) and communicate integrity alerts 12$d_{(n)}$.

The invention is particularly useful when the edge processors (12$c_{(n)}$) communicates with a service notification processor (4*c*) to request a repair service (4*b*). The service notification processor broadcast a notification signal that a service delivery request was made (4*d*). A passerby receives the broadcasted signal (6*a*) and communicate (6*b*) the notification signal (6*c*) to the infrastructure management organization (6*d*), which sends a repair team to the bridge location (6*e*). When the repair team arrives at the location (8*a*) and repairs the infrastructure, the repair team use their devices to communicate (8*b*) with the service notification processor (8*c*) in order to clear the service delivery request and the request notification signal (8*d*).

Figure 14:
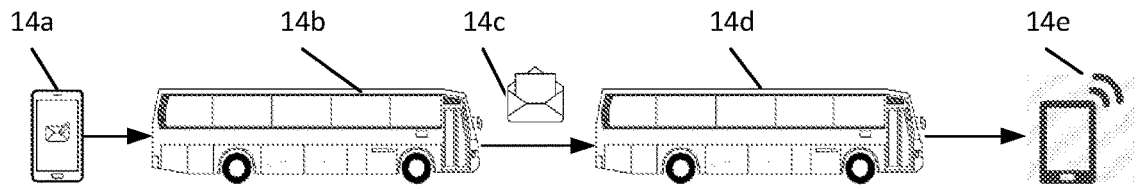
FIGS. 14 and 15 schematically illustrates an embodiment of the invention for improving public transportation accessibility, wherein a person with visual impairment notifies a bus operator driving along a specific public transportation route that she is waiting in a specific bus stop or transferring from another bus down the route.
Figure 15:
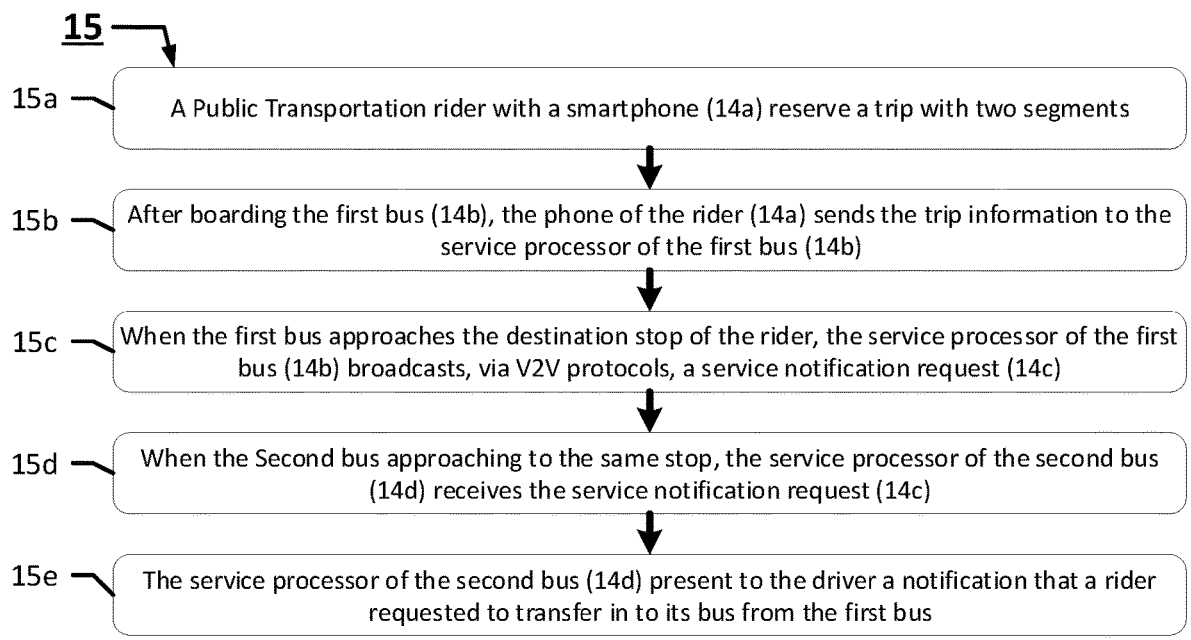

More embodiments of the invention schematically illustrated in FIG. 14 wherein the flow diagram of FIG. 15 describe transfer request notification system for public transportation wherein a mobile app of a rider (14*a*) communicates with a bus notification processor (14*b*) to request a transfer to another bus (14*d*) at a desired stop. The Bus notification processor (14*b*) stores the transfer request and, at the approach to the desired stop, broadcast using V2V a notification signal (14*c*). The other bus (14*d*) receives the notification (14*c*) and alert the driver to wait for the rider that requested the transfer.

The foregoing recites various embodiments for the invention, including various embodiments for the surveillance processor, such as local edge processor, a crowdsourcing security processor, a bus stop notification processor, a virtual fencing processor, and a traffic notification processor. It will thus be seen that, while the invention has been described with respect to a number of embodiments, these are set forth merely for purposes of example, and that many other variations, modifications, and applications of the invention may be made.

I claim:

1. A system for directing physical service to a precise location, comprising:
   a communication channel for transmitting and receiving data, being comprised of at least one of Bluetooth, ZigBee, Vehicle-to-Vehicle ("V2V"), Vehicle-to-Infrastructure ("V2I"), Dedicated Short Range Communications ("DSRC"), wired local area network ("LAN"), Wi-Fi, a cellular network access device, and a wired network;
   at least one device for requesting a service, the at least one device being comprised of
      a first processor being one of an end user device processor, a local edge processor, an alert notification processor, a location aware processor, a crowdsource security processor, a bus stop notification processor, a virtual fencing processor, a traffic alert processor, and a breadcrumb notification processor,
      a first non-transitory computer-readable memory element,
      a first transmitting and receiving circuit capable of transmitting and receiving data via the communication channel, a first output device,
a first input device, and
a power supply;
a first computer readable instruction set, stored on the first non-transitory computer-readable memory element;
a service notification server for receiving service requests, the service notification server being comprised of
at least one service notification processor,
a second non-transitory computer-readable memory element, and
a second transmitting and receiving circuit capable of transmitting and receiving data via the communication channel;
a second computer readable instruction set stored on the second non-transitory memory element;
a plurality of physical notification devices each having a known physical location and each having two states, a first state being no current service orders and a second state being a current service order, which can be changed by a change-in-state order delivered to the physical notification device, connected to the communication channel and capable of changing their state based on data received over the communication channel;
wherein the first input device is capable of initiating the first processor to execute the first computer-readable instruction set, so that it generates a service delivery request from input received on the first input device and transmits the service delivery request through the first transmitting and receiving circuit to the communication channel;
wherein the second transmitting and receiving circuit receives the service delivery request, initiating the at least one service notification processor to execute the second computer-readable instruction set, so that it generates a change-in-state order for the plurality of physical notification devices and transmits the change-in-state order through the second transmitting and receiving circuit to the communication channel;
wherein the plurality of physical notification devices receives the change-in-state order and at least one of the plurality of physical notification devices changes its state in response to receiving the order from the first state to the second state; and
wherein a service is delivered to a known precise physical location as the result of the at least one physical notification devices changing its state upon receiving the order.

2. The system for directing physical service to a precise location of claim 1, wherein the first input device of the user-end electronic device allows a user to type in the service delivery request.

3. The system for directing physical service to a precise location of claim 2, wherein the first input device of the user-end electronic device is a touch-screen.

4. The system for directing physical service to a precise location of claim 1, wherein the first input device of the user-end electronic device is a microphone.

5. The system for directing physical service to a precise location of claim 1, wherein first input device of the user-end electronic device comprises at least one sensor.

6. The system for directing physical service to a precise location according to claim 5, wherein the at least one sensor can detect at least one of proximity, location, time, temperature, precipitation, sound, vibration, or light.

7. The system for directing physical service to a precise location according to claim 1, further comprising a system clock.

8. The system for directing physical service to a precise location according to claim 7, wherein, when the at least one service notification processor executes the second computer readable instruction set, it accesses the system clock and assigns an intensity level to the change-in-state order, tracks the elapsed time from receiving the service delivery request, and adjusts the intensity level based on the elapsed time.

9. The system for directing physical service to a precise location according to claim 1, further comprising a plurality of external information inputs, connected to the communication channel and accessible to the at least one service notification processor, wherein the at least one service notification processor uses the information received from the external information inputs to process a service delivery request into a change-in-state order.

10. The system for directing physical service to a precise location according to claim 1, wherein the communication channel is additionally comprised of at least one of a light transducer, or a sound transducer, and a sensor capable of receiving excitation from the transducer.

11. The system for directing physical service to a precise location according to claim 1, wherein the communication channel supports the transmission of electromagnetic waves.

12. The system for directing physical service to a precise location according to claim 1, wherein the communication channel supports the transmission of pressure waves.

13. The system for directing physical service to a precise location according to claim 1, wherein the communication channel supports the transmission of chemical compounds.

14. The system for directing physical service to a precise location according to claim 1, wherein the communication channel contains a physical device moving underground for relaying data.

15. The system for directing physical service to a precise location according to claim 1, wherein the communication channel contains a physical device moving under water for relaying data.

16. The system for directing physical service to a precise location according to claim 1, wherein the communication channel contains a physical device flying in the air for relaying data.

17. The system for directing physical service to a precise location according to claim 1, wherein the communication channel contains a physical device attached to an animal for relaying data.

* * * * *